(12) United States Patent
Harris

(10) Patent No.: US 7,927,754 B2
(45) Date of Patent: *Apr. 19, 2011

(54) PRESSURE RELIEF FEATURE FOR A FUEL CELL STACK

(75) Inventor: Daniel I. Harris, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 913 days.

This patent is subject to a terminal disclaimer.

(21) Appl. No.: 11/586,856

(22) Filed: Oct. 26, 2006

(65) Prior Publication Data

US 2008/0102334 A1    May 1, 2008

(51) Int. Cl.
*H01M 2/38*      (2006.01)
*H01M 2/40*      (2006.01)
*H01M 8/24*      (2006.01)
*H01M 4/64*      (2006.01)
*H01M 10/34*    (2006.01)
*H01M 2/12*      (2006.01)

(52) U.S. Cl. ............ 429/457; 429/518; 429/57; 429/71; 429/82

(58) Field of Classification Search .................... 429/72, 429/82, 457, 518, 57, 71
See application file for complete search history.

(56) References Cited

U.S. PATENT DOCUMENTS

| | | | |
|---|---|---|---|
| 5,419,980 A | 5/1995 | Okamoto et al. | |
| 5,776,624 A | 7/1998 | Neutzler | |
| 6,159,631 A * | 12/2000 | Thompson et al. | 429/82 |
| 6,280,867 B1 | 8/2001 | Elias | |
| 6,475,651 B1 | 11/2002 | Wilkinson et al. | |
| 6,638,650 B1 | 10/2003 | Bailey et al. | |
| 6,682,844 B2 | 1/2004 | Genc | |
| 6,783,883 B1 * | 8/2004 | Koschany | 429/36 |
| 6,905,793 B2 | 6/2005 | Marianowski et al. | |
| 6,936,369 B1 | 8/2005 | Komura et al. | |
| 6,964,825 B2 | 11/2005 | Farooque et al. | |
| 7,029,780 B2 * | 4/2006 | Ogami et al. | 429/32 |
| 7,282,294 B2 * | 10/2007 | Wang et al. | 429/44 |
| 7,563,305 B2 * | 7/2009 | Zimmermann | 95/90 |
| 7,799,479 B2 * | 9/2010 | Andreas-Schott et al. | 429/453 |
| 2004/0209150 A1 | 10/2004 | Rock et al. | |

* cited by examiner

*Primary Examiner* — Patrick Ryan
*Assistant Examiner* — Julian Mercado
(74) *Attorney, Agent, or Firm* — Fraser Clemens Martin & Miller LLC; J. Douglas Miller

(57) ABSTRACT

A pressure relief feature for a fuel cell stack is disclosed, wherein the pressure relief feature relieves excess pressure from the fuel cell stack and facilitates control of a maximum pressure reached within the fuel cell stack.

18 Claims, 4 Drawing Sheets

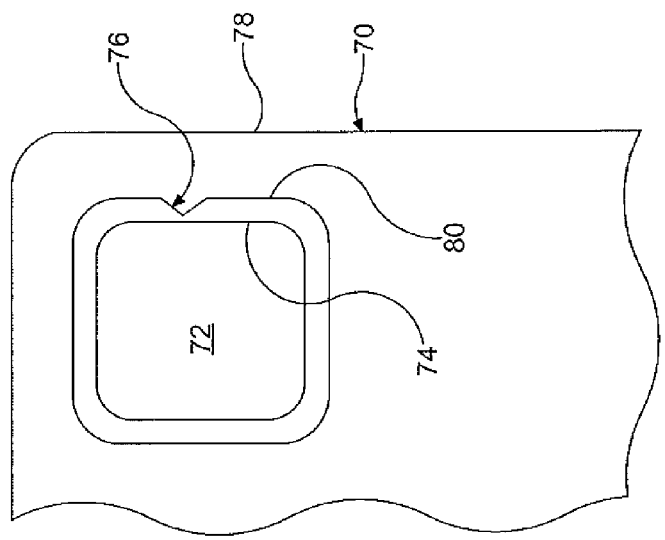
FIG. 6
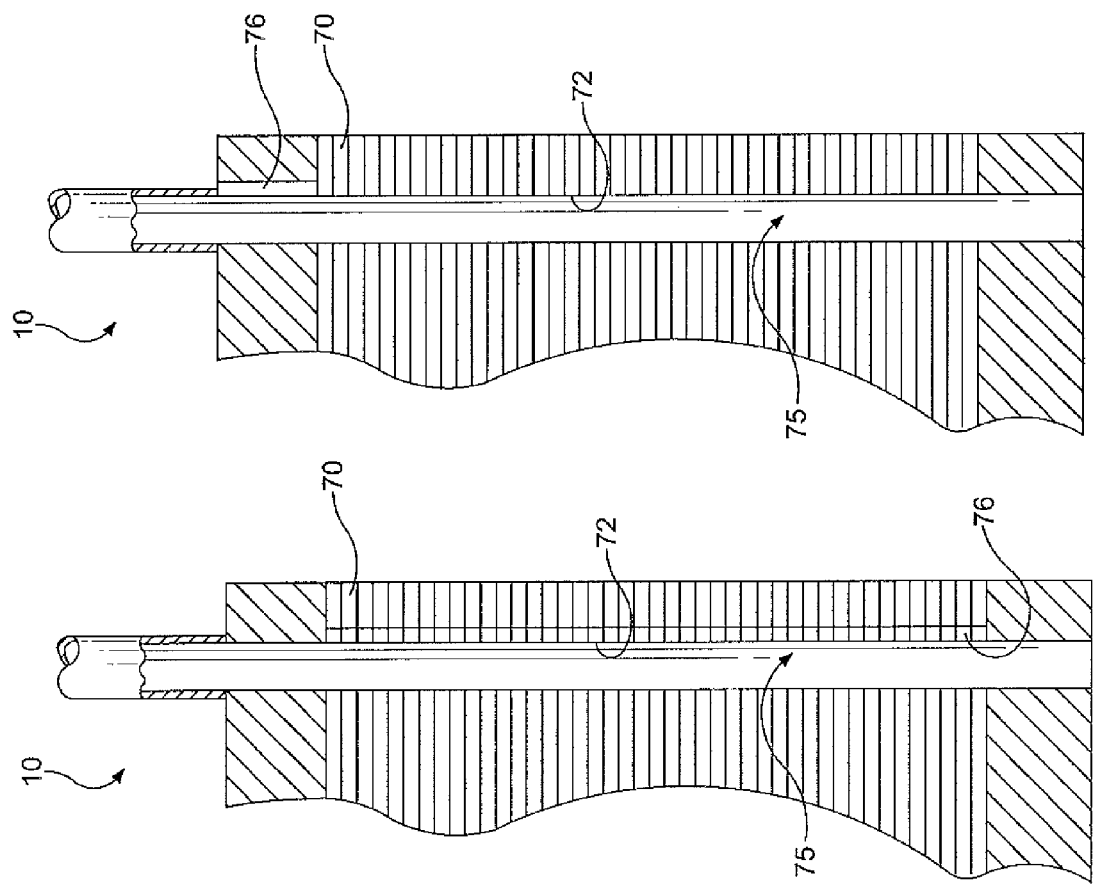
FIG. 5
FIG. 4

PRESSURE RELIEF FEATURE FOR A FUEL CELL STACK

FIELD OF THE INVENTION

The present invention relates to fuel cell stacks and more particularly to pressure relief features for fuel cell stacks for relief of excess pressure from the fuel cell during stacking, pressurization, and operation of the fuel cell stack.

BACKGROUND OF THE INVENTION

A hydrogen fuel cell is an electro-chemical device that includes an anode and a cathode with an electrolyte therebetween. The anode receives a fuel such as hydrogen gas and the cathode receives an oxidant such as oxygen or air. Several fuel cells are typically combined in a fuel cell stack to generate a desired amount of power. A typical fuel cell stack for a vehicle may include several hundred individual cells. Such a fuel cell stack is disclosed in commonly owned U.S. patent application Ser. No. 10/418,536, hereby incorporated herein by reference in its entirety.

The fuel cell stack includes a wet end adapted to receive the fuel, oxidizer, and cooling fluids, and a dry end having an insulation end plate unit. When producing the fuel cell stack, it may be necessary to pressurize the system to prepare the fuel cell stack for operation. The fuel cell stack is typically pressurized to test for leaks and to ensure that the stack will function efficiently. Over pressurization of the fuel cell stack is undesirable.

The basic process employed by a fuel cell is efficient, substantially pollution-free, quiet, free from moving parts (other than an air compressor, cooling fans, pumps and actuators), and may be constructed to leave only heat and water as by-products. The term "fuel cell" is typically used to refer to either a single cell or a plurality of cells depending upon the context in which it is used. The plurality of cells is typically bundled together and arranged to form a stack with the plurality of cells commonly arranged in electrical series. Since single fuel cells can be assembled into stacks of varying sizes, systems can be designed to produce a desired energy output level providing flexibility of design for different applications.

Different fuel cell types can be provided such as phosphoric acid, alkaline, molten carbonate, solid oxide, and proton exchange membrane (PEM), for example. The basic components of a PEM-type fuel cell are two electrodes separated by a polymer membrane electrolyte. Each electrode is coated on one side with a thin catalyst layer. The electrodes, catalyst, and membrane together form a membrane electrode assembly (MEA).

In a typical PEM-type fuel cell, the MEA is sandwiched between "anode" and "cathode" diffusion mediums (hereinafter "DM's") or diffusion layers that are formed from a resilient, conductive, and gas permeable material such as carbon fabric or paper, for example. The DM's serve as the primary current collectors for the anode and cathode as well as provide mechanical support for the MEA. The DM's and MEA are pressed between a pair of electrically conductive plates which serve as secondary current collectors for collecting the current from the primary current collectors. The plates conduct current between adjacent cells internally of the stack in the case of bipolar plates and conduct current externally of the stack (in the case of monopolar plates at the end of the stack).

The secondary current collector plates each contain at least one active region that distributes the gaseous reactants over the major faces of the anode and cathode. These active regions, also known as flow fields, typically include a plurality of lands which engage the primary current collector and define a plurality of grooves or flow channels therebetween. The channels supply the hydrogen and the oxygen to the electrodes on either side of the PEM. In particular, the hydrogen flows through the channels to the anode where the catalyst promotes separation into protons and electrons. On the opposite side of the PEM, the oxygen flows through the channels to the cathode where the oxygen attracts the hydrogen protons through the PEM. The electrons are captured as useful energy through an external circuit and are combined with the protons and oxygen to produce water vapor at the cathode side.

Fuel cell stacks include unit cells and separators. Each fuel cell typically includes a solid polymer electrolyte membrane having a pair of electrode catalysts disposed on opposing surfaces. The fuel cell further includes a pair of collectors, each having a rigid body, the collectors in contact with respective electrode catalysts. Each of the separators includes a pair of pressure generating plates defining therebetween a pressure chamber, to which pressurized fluid is introduced. The pressure generating plates may be deformed by the pressurized fluid, and are pressed against adjacent collectors.

With current designs of fuel cell stacks, large volumes of hydrogen and air are mixed in the manifolds in the fuel cell stack, especially during start up. The mixing of hydrogen and air can result in a rapid production of water. The rapid production of water in the manifolds of the fuel cell stacks can cause over pressurization, resulting in an unpredictable deformation thereof.

It would be desirable to produce a fuel cell stack assembly having a pressure relief feature that relieves excess pressure from the fuel cell stack and facilitates a predictability of a deformation thereof.

SUMMARY OF THE INVENTION

Harmonious with the present invention, a fuel cell stack assembly having a pressure relief feature that relieves excess pressure from the fuel cell stack and facilitates a predictability of a deformation thereof, has surprisingly been discovered.

In one embodiment, a fuel cell comprises at least one end plate; and at least one bipolar plate, wherein at least one of the at least one end plate and the at least one bipolar plate includes an aperture formed therein and a pressure relief feature formed thereon, the pressure relief feature adapted to militate against an over pressurization of a fuel cell stack.

In another embodiment, a fuel cell stack comprises at least one end plate having an aperture formed therein; at least one bipolar plate having an aperture formed therein, wherein the aperture formed in the at least one end plate and the aperture formed in at least one bipolar plate cooperate to form a manifold and provide fluid communication between the at least one end plate and the at least one bipolar plate; and a pressure relief feature adapted to militate against an over pressurization of the fuel cell stack.

In another embodiment, a fuel cell stack comprises a fuel source in communication with an anode; an oxidant source in communication with a cathode; at least one end plate having an aperture formed therein; and at least one bipolar plate having an aperture formed therein, wherein the aperture formed in the at least one end plate and the aperture formed in at least one bipolar plate cooperate to form a manifold and provide fluid communication between the at least one end plate and the at least one bipolar plate; and a pressure relief feature adapted to militate against an over pressurization of the fuel cell stack, wherein the pressure relief feature is at least one of a burst disc, a gasket, and an end seal.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 4 is a fragmentary cross-sectional elevational view of a fuel cell stack assembly in accordance with another embodiment of the invention, wherein a pressure relief feature is at least a portion of at least one bipolar plate having a notch formed therein;

FIG. 5 is a fragmentary cross-sectional elevational view of a fuel cell stack assembly in accordance with another embodiment of the invention, wherein a pressure relief feature is at least a portion of at least one end plate having a notch formed therein;

FIG. 6 is a fragmentary top plan view of a manifold portion of a bipolar plate in accordance with an embodiment of the invention, wherein a pressure relief feature is at least a portion of a seal having a notch formed therein;

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
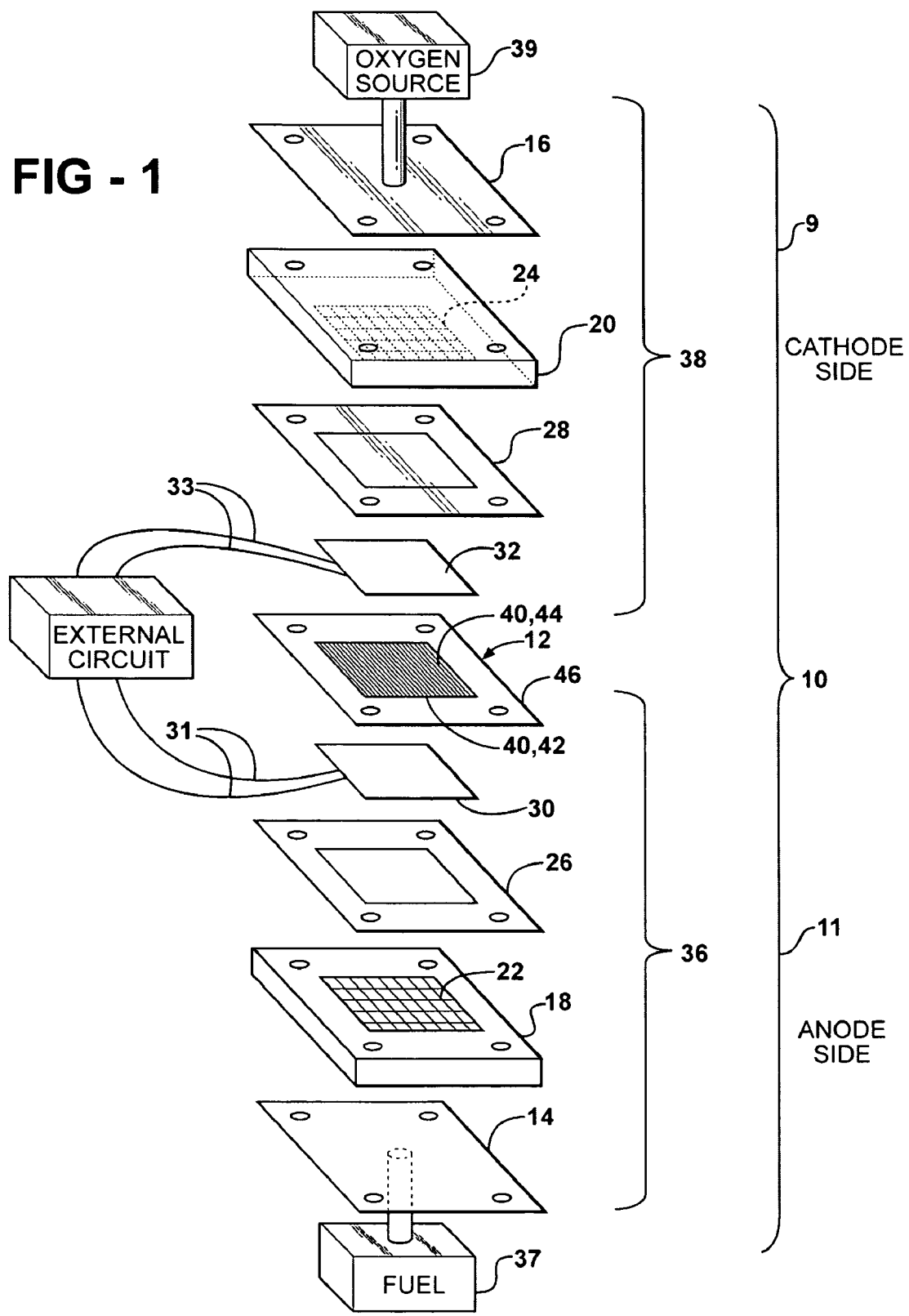
FIG. 1 is an exploded perspective view of a fuel cell system in accordance with an embodiment of the invention.

FIG. 1 shows a fuel cell 10 having a cathode side 9 and an anode side 11. It is understood that other fuel cell types and configurations can be used without departing from the scope and spirit of the invention. It is also understood that fuel cell stacks having more cells and plates can be and typically are used. The anode side 11, the cathode side 9, and a coolant system (not shown) are collectively referred to as a wet end of the fuel cell 10. End plates 14, 16 are referred to as a dry end of the fuel cell 10. The fuel cell 10 includes a fuel source 37, an oxidant source 39, the end plates 14, 16, graphite blocks 18, 20 having a plurality of openings 22, 24 to facilitate fluid distribution, gaskets 26, 28, carbon cloth current collectors 30, 32 having respective connections 31, 33, and a membrane electrolyte and electrode assembly (MEA) 12. An oxidant and current transport means 36 is made up of the graphite block 18, the gasket 26, and the current collector 30. A fuel and current transport means 38 is made up of the graphite block 20, the gasket 28, and the current collector 32. The anode connection 31 and the cathode connection 33 interconnect the fuel cell 10 with an external circuit, and may include other fuel cells (not shown) as desired.

In use, a fuel such as hydrogen is supplied from the fuel source 37 and an oxidant such as oxygen, for example, is supplied from the oxidant source 39. The fuel and oxidant from respective sources 37, 39 diffuse through respective fluid and current transport means 36, 38 to opposing sides of the MEA 12. Porous electrodes 40 form an anode 42 at the anode side 11 and a cathode 44 at the cathode side 9, and are separated by a Proton Exchange Membrane (PEM) 46. The PEM 46 provides for ion transport to facilitate a chemical reaction in the fuel cell 10. The fuel is consumed during the chemical reaction, resulting in the formation of water and electricity. Typically, the PEM 46 is produced from copolymers of suitable monomers. Such proton exchange membranes may be characterized by monomers of the structures:

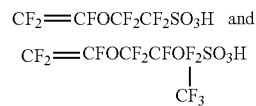

Such a monomer structure is disclosed in detail in U.S. Pat. No. 5,316,871 to Swarthirajan et al., incorporated herein by reference in its entirety. It is understood that the PEM 46 may be produced from other materials as desired.

Figure 2:
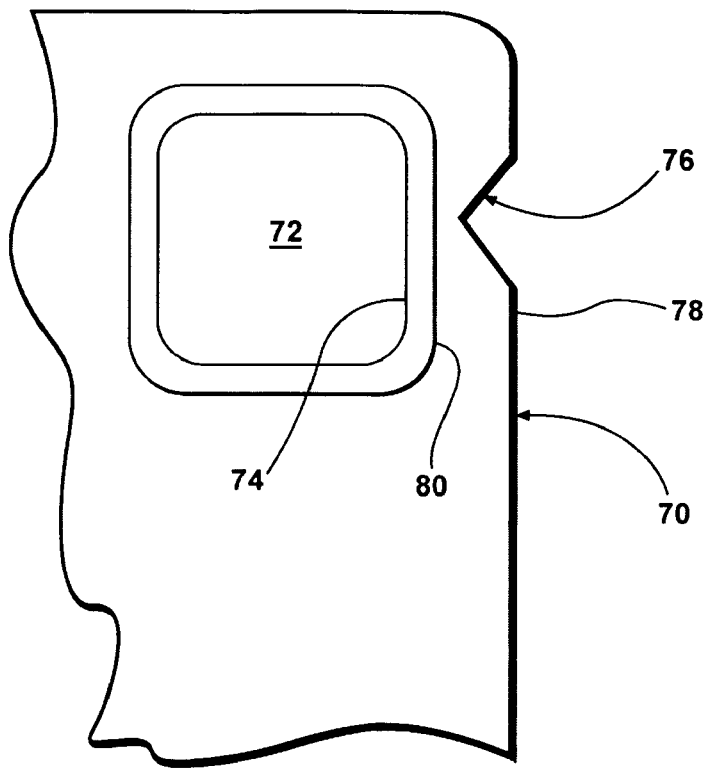
FIG. 2 is a fragmentary top plan view of a manifold portion of a bipolar plate in accordance with an embodiment of the invention.

FIG. 2 shows a manifold portion of a bipolar plate 70 according to an embodiment of the invention. A fuel cell stack (not shown) is typically constructed of a plurality of fuel cells 10 bundled together and arranged to form the stack, with the plurality of cells 10 commonly arranged in electrical series. Each adjacent fuel cell 10 is separated by a bipolar plate 70.

The bipolar plate 70 includes an aperture 72 formed therein. When the fuel cells 10 are arranged to form a stack, au inner surface 74 forming the aperture 72 cooperates with the inner surface 74 of adjacent fuel cells 10 to form a manifold 75.

A pressure relief feature 76 is formed at an outer edge 78 of the bipolar plate 70 adjacent the aperture 72. However, the pressure relief feature 76 can be formed at other locations as desired without departing from the spirit or scope of the invention, such as the inner surface 74, for example. In the embodiment shown, the pressure relief feature 76 is formed as a triangular shaped notch, although pressure relief features having other shapes and configurations can be used as desired.

In the embodiment shown, a seal 80 is disposed around the aperture 72. As used herein, the term seal includes a gasket, an o-ring, a bead seal, and the like. Although the seal 80 is shown as completely surrounding the aperture 72, it is understood that the seal 80 can be disposed around only a portion of the aperture, if desired. Additionally, it is understood that multiple seals 80 can be used if desired.

In use, the fuel and oxidant are introduced into the fuel cell stack and mixed. During the chemical reaction between the fuel and oxidant, pressure can build up within the fuel cell stack, such as in the manifold formed by the apertures 72 of the plurality of plates 70 forming the fuel cell stack. This is especially true during startup. Upon reaching a predetermined pressure within the fuel cell stack, the pressure relief feature 76 is caused to fail, and the pressure is relieved from the stack. This facilitates deformation of the plates 70 in a desired location, a predictability of the location of deformation, and a control of a maximum pressure reached within the fuel cell stack. It is further understood that the pressure relief feature 76 can be formed in the seal 80 surrounding the aperture 72 without departing from the scope and spirit of the invention. Thus, upon reaching the predetermined pressure, the pressure relief feature 76 formed in the seal 80 is caused to fail to relieve the pressure from the fuel cell stack.

Figure 3:
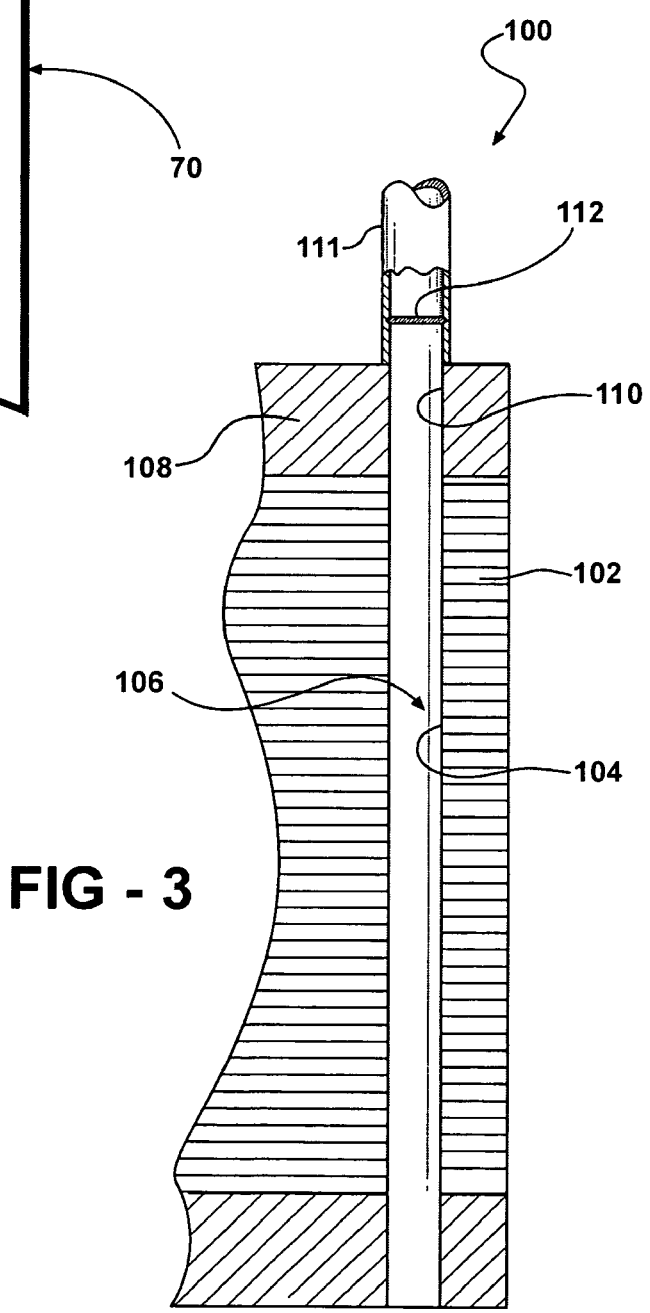
FIG. 3 is a fragmentary cross-sectional elevational view of a fuel cell stack assembly in accordance with another embodiment of the invention.
Figure 7:
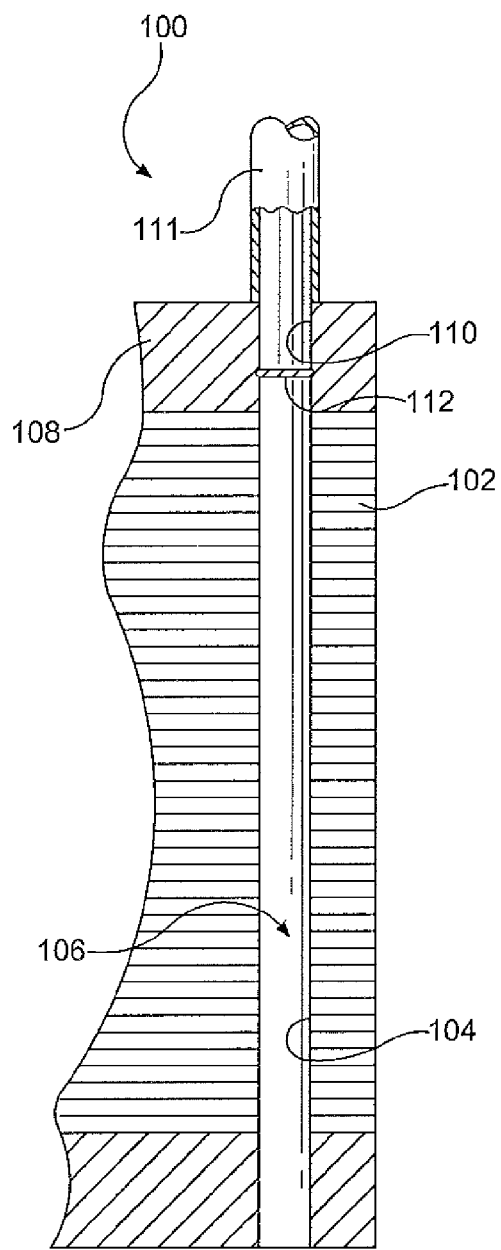
FIG. 7 is a fragmentary cross-sectional elevational view of a fuel cell stack assembly in accordance with another embodiment of the invention, wherein a pressure relief feature is disposed in an interior portion of at least one end plate.
Figure 8:
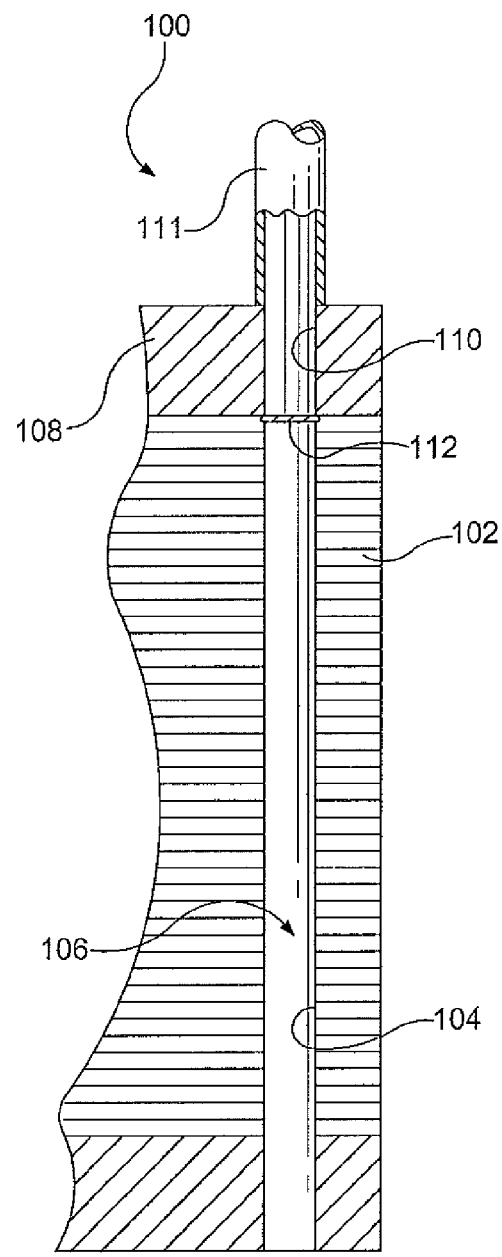
FIG. 8 is a fragmentary cross-sectional elevational view of a fuel cell stack assembly in accordance with another embodiment of the invention, wherein a pressure relief feature is disposed in an interior portion of at least one bipolar plate.

FIG. 3 shows a fuel cell stack assembly 100 in accordance with another embodiment of the invention. In this embodiment shown, a plurality of bipolar plates 102 are arranged to form the fuel cell stack assembly 100. Each of the plates 102 includes an aperture 104 formed therein. The apertures 104 of each plate 102 are aligned to form a manifold 106. An end plate 108 is disposed on the plates 102. The end plate 108 includes an aperture 110 which is aligned with the apertures 104 of the plates 102. An extension conduit 111 is disposed in and extends axially outwardly from the aperture 110. A pressure relief feature 112 is disposed in the extension conduit 111. The pressure relief feature 112 can be any conventional pressure relief feature such a burst disk, a gasket, an end seal, and the like, as desired. It is understood that the pressure relief feature 112 can be disposed in other locations as desired, such as within the manifold 106, for example. If desired, the extension conduit 111 can be releasably attached to the end plate 108 to facilitate replacement of the pressure relief feature 112.

In use, upon reaching a predetermined pressure within the fuel cell stack 100, the pressure relief feature 112 is caused to fail or rupture, and the pressure is relieved from the fuel cell stack 100 before an over pressurization causes damage to other structure contained in the fuel cell stack 100.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fuel cell stack comprising:
   at least one end plate; and
   at least one bipolar plate, wherein at least one of the at least one end plate and the at least one bipolar plate includes an aperture formed therein and a rupturable pressure relief feature formed thereon, wherein the pressure relief feature ruptures at a predetermined pressure to control a maximum pressure reached within the fuel cell stack, thereby militating against an over pressurization of and damage to the fuel cell stack.

2. The fuel cell stack according to claim 1, wherein the pressure relief feature includes at least a portion of at least one of the at least one end plate, the at least one bipolar plate, and a seal, the portion having a notch formed therein.

3. The fuel cell stack according to claim 1, wherein the pressure relief feature is disposed in an interior portion of at least one of the at least one end plate and the at least one bipolar plate.

4. The fuel cell stack according to claim 1, wherein the pressure relief feature is disposed adjacent the aperture formed in at least one of the at least one end plate and the at least one bipolar plate.

5. The fuel cell stack according to claim 1, wherein the pressure relief feature is formed from a material having a weaker strength than a strength of at least one of the at least one end plate and the at least one bipolar plate.

6. The fuel cell stack according to claim 1, wherein the at least one end plate and the at least one bipolar plate include an aperture formed therein.

7. The fuel cell stack according to claim 6, wherein the apertures formed in the at least one end plate and the at least one bipolar plate cooperate to form a manifold and provide fluid communication between the at least one end plate and the at least one bipolar plate.

8. A fuel cell stack comprising:
   at least one end plate having an aperture formed therein;
   at least one bipolar plate having an aperture formed therein, wherein the aperture formed in the at least one end plate and the aperture formed in at least one bipolar plate cooperate to form a manifold and provide fluid communication between the at least one end plate and the at least one bipolar plate; and
   a rupturable pressure relief feature, wherein the pressure relief feature includes at least a portion of at least one of the at least one end plate, the at least one bipolar plate, and a seal, the portion having a notch formed therein, and wherein the pressure relief feature ruptures to militate against an over pressurization of the fuel cell stack.

9. The fuel cell stack according to claim 8, wherein the pressure relief feature is disposed adjacent the manifold.

10. The fuel cell stack according to claim 8, wherein the pressure relief feature is disposed within an extension conduit disposed adjacent and in fluid communication with the manifold.

11. The fuel cell stack according to claim 8, wherein the pressure relief feature is adapted to rupture at a predetermined pressure to militate against the over pressurization of the fuel cell stack.

12. The fuel cell stack according to claim 8, wherein the notch formed in at least one of the at least one end plate, the at least one bipolar plate, and the seal is formed as a triangular shaped notch.

13. The fuel cell stack according to claim 8, wherein the portion of at least one of the at least one end plate, the at least one bipolar plate, and the seal having the notch formed therein has a strength lower than a strength of at least one of the at least one end plate and the at least one bipolar plate.

14. The fuel cell stack according to claim 8, wherein the notch is formed in at least one of an inner surface and an outer surface of the at least one end plate, the at least one bipolar plate, and the seal.

15. A fuel cell stack comprising:
   a fuel source in communication with an anode;
   an oxidant source in communication with a cathode;
   at least one end plate having an aperture formed therein;
   at least one bipolar plate having an aperture formed therein, wherein the aperture formed in the at least one end plate and the aperture formed in at least one bipolar plate cooperate to form a manifold and provide fluid communication between the at least one end plate and the at least one bipolar plate; and
   a rupturable pressure relief feature adapted to rupture at a predetermined pressure to control a maximum pressure reached within the fuel cell stack, thereby militating against an over pressurization of and damage to the fuel cell stack, wherein the pressure relief feature is at least one of a burst disc, a gasket, and an end seal.

16. The fuel cell stack according to claim 15, wherein the pressure relief feature is disposed within an extension conduit disposed adjacent and in fluid communication with the manifold.

17. The fuel cell stack according to claim 15, wherein the pressure relief feature is disposed in an interior portion of at least one of the at least one end plate and the at least one bipolar plate.

18. The fuel cell stack according to claim 15, wherein the pressure relief feature is formed from a material having a strength lower than a strength of at least one of the at least one end plate and the at least one bipolar plate.

* * * * *